United States Patent [19]
Wirt

[11] 3,820,627
[45] June 28, 1974

[54] APPARATUS FOR NOISE AND AIR POLLUTION ABATEMENT

[75] Inventor: Leslie S. Wirt, Newhall, Calif.

[73] Assignee: Lockheed Aircraft Corporation, Burbank, Calif.

[22] Filed: Aug. 28, 1972

[21] Appl. No.: 284,423

[52] U.S. Cl............ 181/33 G, 98/115 R, 181/33 C, 181/33 K
[51] Int. Cl............................................. E04b 1/84
[58] Field of Search.... 181/33 R, 33 C, 33 G, 33 K, 181/33 HA, 33 HB, 33 HC; 98/1.5, 40 D, 98/115 SB, 115 R; 60/39.72 P

[56] References Cited
UNITED STATES PATENTS

| | | | |
|---|---|---|---|
| 2,291,220 | 7/1942 | Germonprez | 181/33 G UX |
| 2,912,918 | 11/1959 | Mead | 181/33 G UX |
| 2,935,151 | 5/1960 | Watters et al. | 181/33 R X |
| 2,941,356 | 6/1960 | Blackman | 181/33 HC UX |
| 3,239,973 | 3/1966 | Hannes et al. | 181/33 G UX |
| 3,333,524 | 8/1967 | Mariner | 181/33 G UX |
| 3,376,803 | 4/1968 | Emmons | 98/1.5 |
| 3,515,240 | 6/1970 | Sugiyama et al. | 181/33 K X |

Primary Examiner—Richard B. Wilkinson
Assistant Examiner—John F. Gonzales
Attorney, Agent, or Firm—George C. Sullivan; Ralph M. Flygare

[57] ABSTRACT

A system for simultaneously controlling airborne noise and air pollutants. Comprises an acoustic panel or enclosure constructed of a permeable sheet separated by an air space from an impermeable sheet, and includes means for inducing a ventilating flow of air through the permeable sheet. The air flow and permeability of the sheet are selected to lie within a specified range such that $\Delta p/u \approx Z$ where $\Delta p$ is the differential pressure across the sheet, u is the velocity of air approaching the sheet, and Z is the characteristic impedance of air. Especially suitable for ventilating hoods, enclosures, or semi-enclosures for machine tools, spray booths, welding apparatus, and the like.

12 Claims, 4 Drawing Figures

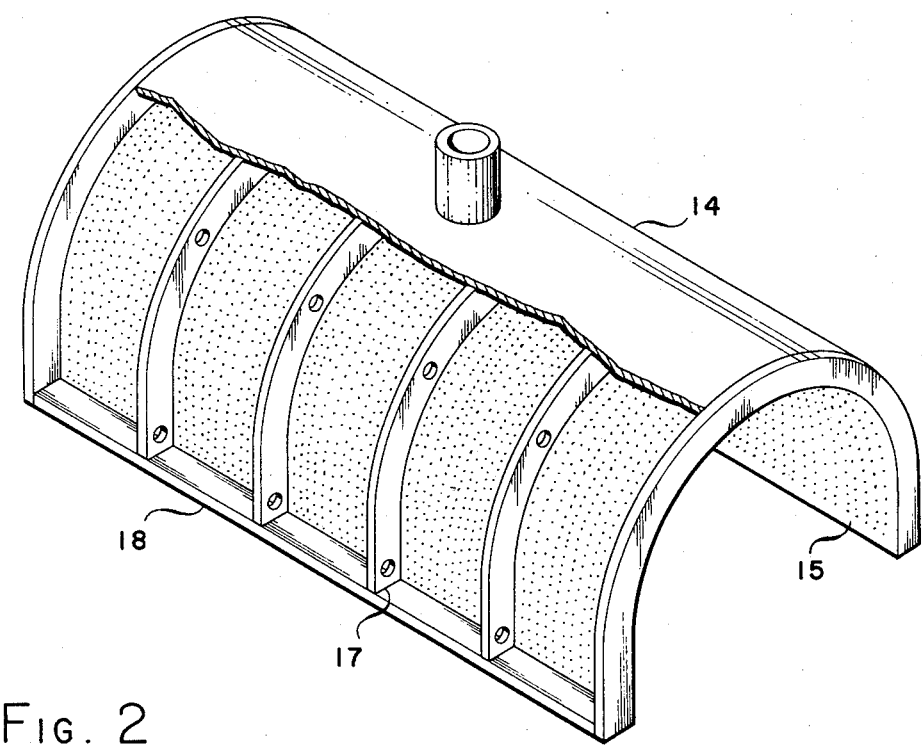
Fig. 2
Fig. 3
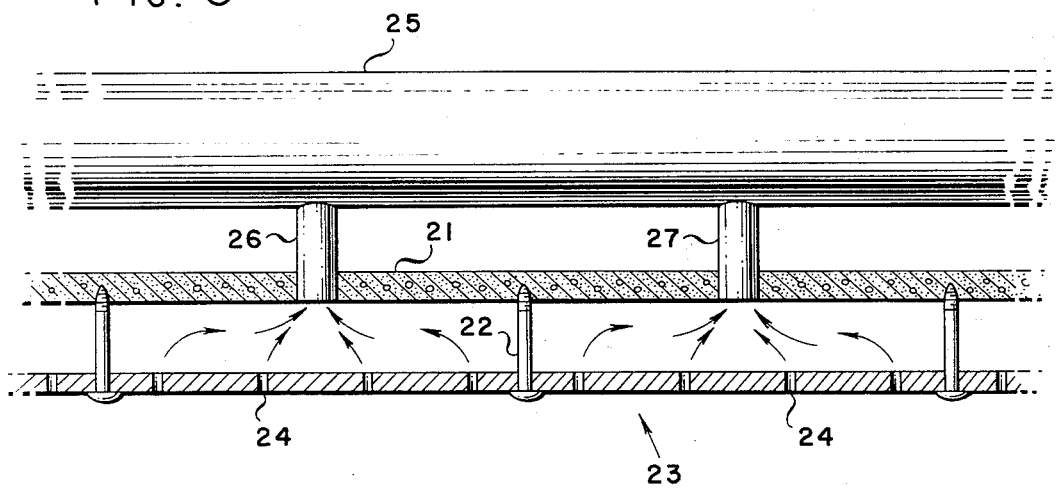

APPARATUS FOR NOISE AND AIR POLLUTION ABATEMENT

BACKGROUND OF THE INVENTION

1. Field of the Invention

The invention relates to a system for controlling noise and air pollution generated by machine tools, spray apparatus, etc., and comprises a novel structure adapted to the fabrication of ventilating hoods, or the like, having sound absorption properties.

The Walsh-Healy Act of 1969 has figuratively put acoustical enclosures around noisy equipment in many industrial sites. As a consequence of this Act, if a manufacturer, performing federal contract work fails to meet certain noise exposure standards, the government can cancel his contract and cause other unpleasantries. Additionally, the government can place the offending company on a black list that prevents the company from performing governmental contract work for three years. Additional federal legislation known as the Williams-Steiger Occupational Safety and Health Act of 1970 (OSHA) imposes similar sanctions on exposure of workers to unsafe environmental conditions including hazards related to air pollution. The abatement of these harmful environmental conditions is the principal objective of the invention.

2. Prior Art

Heretofore systems have been proposed of the hollow wall type wherein ventilation and sound absorption functions are integrated in order to abate air and noise pollution. A variety of systems, such as those shown in U.S. Pats. Nos. 2,172,771, 2,172,851, 3,058,411, 3,210,534, 3,333,524, and 3,482,505, employ perforated wall members making it possible to integrate their ventilation and sound absorption functions. In each case, however, these prior art systems comprise a combination of a sound absorptive material, or a sound barrier, or a plenum chamber, or a combination of these elements, with an inner perforated panel to accomplish the separate functions of sound absorption and ventilation.

Notwithstanding the prior existence of a variety of sound absorbing schemes, it has been very difficult to provide adequate noise control in factory areas in which metal working and other types of machine tools are located. The continuous condensation of coolants or cutting oil mists produces a serious housekeeping problem. As a result, the use of hard, easily cleanable surfaces has been encouraged. However, such surfaces cause working areas to be particularly reverberant. The use of all conventional fibrous acoustical materials for sound abatement in such environments has been inhibited by reason of their propensity to wick and accumulate the condensed mist. This can be structurally harmful to the acoustical material, can degrade its sound absorbing qualities, and in the case of combustible liquids can create a serious fire hazard. In particular it has been virtually impossible to place fibrous acoustical materials in close proximity to the source of machine-generated noise, usually the cutting or grinding area, since there is a likelihood of its being exposed to sprays of liquid, flying chips, etc. This would saturate the fibrous materials and mechanically damage them, or both.

SUMMARY OF THE INVENTION

The present invention comprises an impermeable outer wall, a permeable inner wall having perforations which will result in a specified flow resistance, an air suction means for drawing air at a prescribed velocity through the inner wall to the space between the inner and outer wall and ultimately discharging that air into the atmosphere or subsequent treatment area. This structure may be incorporated into ventilating hoods or machine enclosures (or semi-enclosures) for a variety of industrial or other pollution-abatement applications. Where the system is employed for an entire room, the inner and outer walls of the absorber structure preferably constitute the room's ceiling.

The essence of the invention resides in the discovery that there exists a narrow range of flow conditions wherein a perforated plate can operate as a ventilating means and sound absorption means simultaneously; in particular, the ratio of differential pressure across the plate to the velocity of gas approaching the plates must approximate the acoustical impedance of air.

BRIEF DESCRIPTION OF THE DRAWINGS

FIG. 2 is a perspective view of the hood portion of the apparatus of FIG. 1, shown partially cut away;

FIG. 3 is a detailed cross sectional view of another embodiment of the invention; and, FIG. 4 is a block diagram of a sound absorber incorporating an automatic regulator system suitable for maintaining optimum performance of the invention.

DESCRIPTION OF THE PREFERRED EMBODIMENTS

Figure 1:
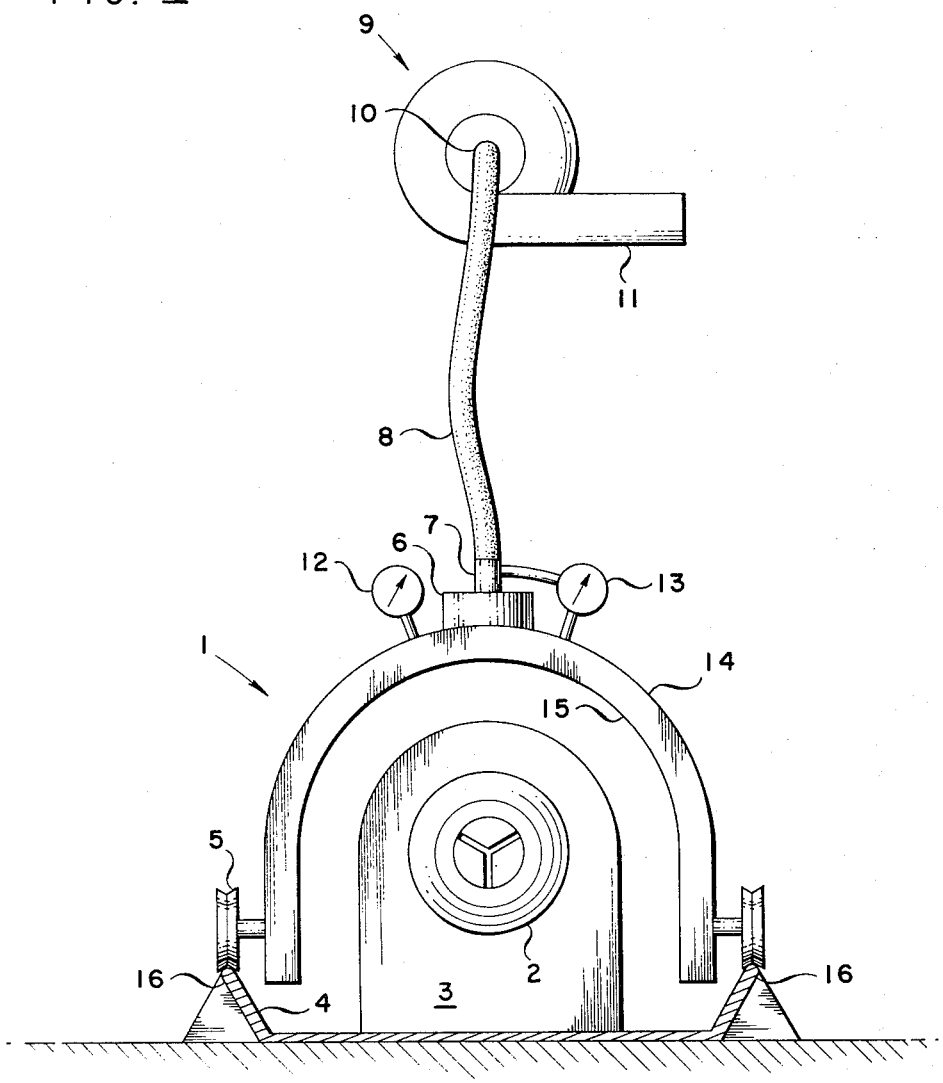
FIG. 1 is a diagrammatic cross-section view of a first embodiment of the invention.

Referring to FIG. 1 there is shown the general arrangement of a sound and air-pollution abatement system incorporating the apparatus of the invention, and as more particularly applicable to a semi-enclosure or hood for a machine tool such as a metal-cutting lathe. As is well known to those versed in the art, most machine tools generate potentially hazardous noise levels which pose a threat to the hearing of their operators or other persons in the area. Many of these machines also release contaminants into the air as a consequence of their being flooded, sprayed, or otherwise supplied with various coolants, lubricants, and cutting oils. Normally there is an emission which may comprise smoke or a fine mist of the coolants or oils. Together these tend to form a haze or smoke-like condition which contaminates the air which the operating personnel must breath. In the case of dry grinders, spray booths, and the like, the process releases microscopic particles into the air unless provision is made for directed and forced ventilation. These dry operations also frequently generate unacceptable noise levels.

To overcome the aforementioned hazards a tunnel-like hood 1, constructed in accordance with the invention, covers the general region where the process of interest occurs. In the example shown, a stock holding chuck 2 is supported in headstock 3. Beneath the working area is a pan 4 designed to catch the coolant, chips, etc. Wheels 5 are provided on either side of hood 1 so that it can be conveniently rolled away to expose the cutting area for inspection or other operations. Plenum 6 collects air from under hood 1, and the air thus collected passes through flow measuring section 7 into flexible conduit 8 and is finally exhausted via discharge conduit 11 by blower 9 after having entered the blower at inlet 10. Exhaust air and entrained particulate matter in the discharge conduit 11 may be further processed through conventional and well-known contaminant traps, if desired.

Gage 12 indicates the pressure (below ambient) between the outer solid wall 14 and the inner perforated wall 15 of the hood 1. Gage 13 indicates the differential pressure across the flow-measuring section 7.

The flow of air through the system functions to collect fumes, mists, smoke, or other airborne pollutants generated in the area (e.g., 2–3) enclosed by the hood 1.

FIG. 2 further illustrates the construction of the hood 1 portion of the apparatus of FIG. 1. As can be seen, the inner perforate wall 15 may be spaced apart from impermeable or impervious outer wall 14 by means of a plurality of spacers, a typical one of which is indicated at 17. To constrain the flow to pass through permeable inner wall 15, the lower edges of the hood 1 are closed by means of impervious strips such as indicated at 18. The hood 1 may be open at either end along its longitudinal axis, if desired.

It has been discovered that there is a specific, but narrow range of flow conditions under which perforated sheets of a specified flow resistance are also highly sound absorptive. Thus, there is a particular set of values for the system's parameters such that if certain interrelationships are satisfied the structure may perform both ventilating and sound absorption functions efficiently and simultaneously. Since sound absorption is accomplished without the use of any fibrous material, the sound absorption surface may safely be placed in close proximity to the source of pollutants. In a practical construction it has been shown that the sound absorption surface of the present invention can efficiently operate directly in sprays of oil or coolant, and showers of heated chips ejected from metal-working machines.

The aforementioned operative interrelationships exist only if the flow resistance of the perforate sheet material approximates the characteristic impedance $Z$ of the air.

$$Z = \rho c$$

Where:
$\rho$ = density of air
$c$ = velocity of sound in air

In centimeter-gram-second (cgs) units the characteristic impedance of ambient air is about 42 and the units are called "rayls." Thus, the structure will absorb sound effectively only if:

$$\Delta p / u \approx 42 \text{ rayls}$$

Where:
$\Delta p$ = differential pressure across a sheet
$u$ = velocity of air approaching the sheet The through flow resistance of bulk fibrous material, and many sheet materials formed by felting fibers, such as are widely used in prior art sound absorbers, is nearly independent of the pressure differential applied across them, and for this reason they are called "linear materials." Perforated sheets, however, have the peculiarity that their through flow resistance depends markedly on the differential pressure thereacross. For this reason, perforates are called "nonlinear materials," and their characteristics can be expressed as follows:

$$\Delta p / u = R_0 + R_1 u \text{ rayls}$$

Where:
$R_0$ is a viscous resistance
$R_1$ is an approximately constant coefficient which depends on the open area, hole size and shape, and thickness of the perforate.

In general, $R_0$ is so small that it can be neglected for all ordinary perforate materials. The constant $R_1$ is best determined empirically. As can be seen from the above-stated relationship, the desired through flow resistance of 42 rayls can be provided by a given perforated sheet only in the presence of particular through flows, induced by particular values of $\Delta p$. The range of acoustically useful values of through flow resistance is fairly narrow, and is normally approximately 10 to 200 rayls. It follows that for any given approach velocity to a particular perforate, the useful range of $\Delta p$ is relatively limited.

To assure that the system is operating within its intended range of parameters, it is desirable to monitor both the amount of ventilating flow and the negative pressure on the inner side of the structure. The differential pressure gage 13, shown in FIG. 1, is connected across the flow measuring section 7 (which may comprise an orifice or venturi) indicates whether the proper amount of air flow is passing through the perforated surface of inner wall 15. The vacuum gage 12 indicates whether the value of $\Delta p$ across the perforate 15 is within the desired operating range. It is evident that the perforated sheet may then perform its desired sound absorbing functions and its concurrent ventilating function notwithstanding the existence of adverse environmental conditions such as liquid splash and spray, exposure to flying chips, etc.

The incorporation of the system of the invention into machine enclosures, ventilating hoods, and the like, may include various ancillary features. For example, in the case of a machine enclosure a desirable feature is the ability to roll the enclosure out of the way to inspect or service the machine. In the example shown in FIG. 1, the lip of the conventional chip pan 4 can serve as the track 16 upon which the enclosure 1 moves.

Referring to FIG. 3 there is shown an alternate embodiment of the invention especially applicable to incorporation into the wall structure of a room for ventilation and general sound absorption to reduce the level of reverberation. The operating principles are the same as those disclosed above in connection with the description of FIGS. 1 and 2. As can be seen the structure comprises the impervious wall 21 (or ceiling) of the room. Hangers 22 secure perforate facing panel 23 in spaced-apart relationship with respect to wall 21. Facing panel 23 is provided with a plurality of small apertures or perforations 24, the shape and dimensions of which are selected to provide the necessary flow resistance. Conduit 25 is connected to a means for applying a suction (not shown), and is coupled to the compartmented space between wall 21 and panel 23 by means of a plurality of interconnecting ducts 26–27. The means for applying suction to the region between wall 21 and panel 23 develops the necessary flow velocity through the system to result in the desired sound absorption and ventilating functions. The suction source may comprise a centrifugal fan, pump, venturi, or other suitable and well-known device. The ventilating flow is used to bias the flow resistance of the perforated sheet or panel 23 into the acoustically useful range.

The above described structure need not be incorporated into the ceiling of the room, since the same principles can be readily adapted to the construction of side walls, or even the floor of the room. Also, the construction shown in FIG. 3 may be incorporated into various types of booths which require ventilation and which also may benefit from acoustical treatment. Typically such conditions exist in spray painting booths, or booths in which hand finishing operations are performed by means of noise and particle generated grinding tools.

The invention may be readily adapted to numerous other applications including fume cabinets, shot-peen machines, and the like, wherein noise control and concurrent contaminate control are desired. As an example of a practical construction, there follows the design specifications for a hood to adequately surround and abate the noise and fumes produced by a screw machine. The dimensions of the screw machine head dictate a rectangular tunnel 3 feet $\times$ 3 feet $\times$ 4 feet long. The unavoidable open area at the two ends is 18 ft².

To provide adequate contaminant control, conventional engineering practice dictates that the air in the open area should move at an average velocity of 120 feet per minute (2 feet per sec). Thus, the blower must be sized to pass 2,160 cfm = 36 cfs. Total absorption area = 36 ft². The approach velocity to the absorptive surface is 1 ft/sec. At this point it is convenient to convert to metric units. Approach velocity = 1 foot/sec = 30 cm/sec. A design point of 60 rayls is selected.

$$\Delta p / u = 60 \text{ rayls}$$

$$\Delta p = 60 \times 30 \text{ dyne/cm}^2$$

$$\Delta p = 1{,}800 \text{ dyne/cm}^2 = 1.8 \times 10^3 \text{ dyne/cm}^2$$

The $\Delta p$ across the sheet is $1.8 \times 10^3$ dyne/cm² = 0.69 inch H₂O
Select the perforate
$R = R_0 + R_1 u$
For round hole perforations
$R_0$ is negligible
$R = R_1 u$
From the theory of nonlinear flow resistance $$R_1 = b\, \rho / g^2$$

Where:
$\rho$ = density of air
$g$ = coefficient of open area
$b$ = a coefficient $0 < b < 1$
a typical value for $b$ is 0.5

$$R_1 = R/u = 60/30 = 2$$

$$\tfrac{1}{2}\, \rho / g^2 = 2$$

$$g^2 = \rho / 4$$

$$g = \tfrac{1}{2} \sqrt{\rho}\; \tfrac{1}{2}\, \sqrt{.0012}$$

$$g = \sqrt{12/2} \times 10^{-2}$$

$$g = 0.0346/2$$

$$g = 1.73 \text{ percent open area}$$

This calculation is approximate and in practice should be verified on a flow bench for particular perforates. Hole diameter should be minimal and hole spacing should be small compared to the wavelength of the highest sound frequency of interest. For aluminum sheet 0.030 thick, holes 0.060 diameter are practical, then for a square array:

$$\pi 0.030^2 / d^2 = 0.0173$$

$$3.14 \times 9 \times 10^{-4} / 1.73 \times 10^{-2} = d^2$$

$$d^2 = 16.3 \times 10^{-2}$$

$$d = 4 \times 10^{-1}$$

$$d = 0.4 \text{ inch}$$

It should be noted that perforates with such a small percentage of open area would not be reasonably selected for ventilation grills in prior art constructions since for ventilation purposes only, the large pressure drop across such a perforate would be considered of such poor design as to be practically unsuitable. However, where the added function of sound absorption is obtained, the necessary augmentation of the suction system to make up for the higher pressure drop across the perforate panel becomes a practical trade-off.

As will be appreciated, in practical use the ventilation system will tend to filter particulate matter, grease, and other solid materials out of the airstream moving through the perforate sheet. This will, in time, clog up the pores or openings in the sheet. Since this will change the quantitative values in the relationship defining the operable range of the sound absorption function, optimum performance will be degraded.

Figure 4:
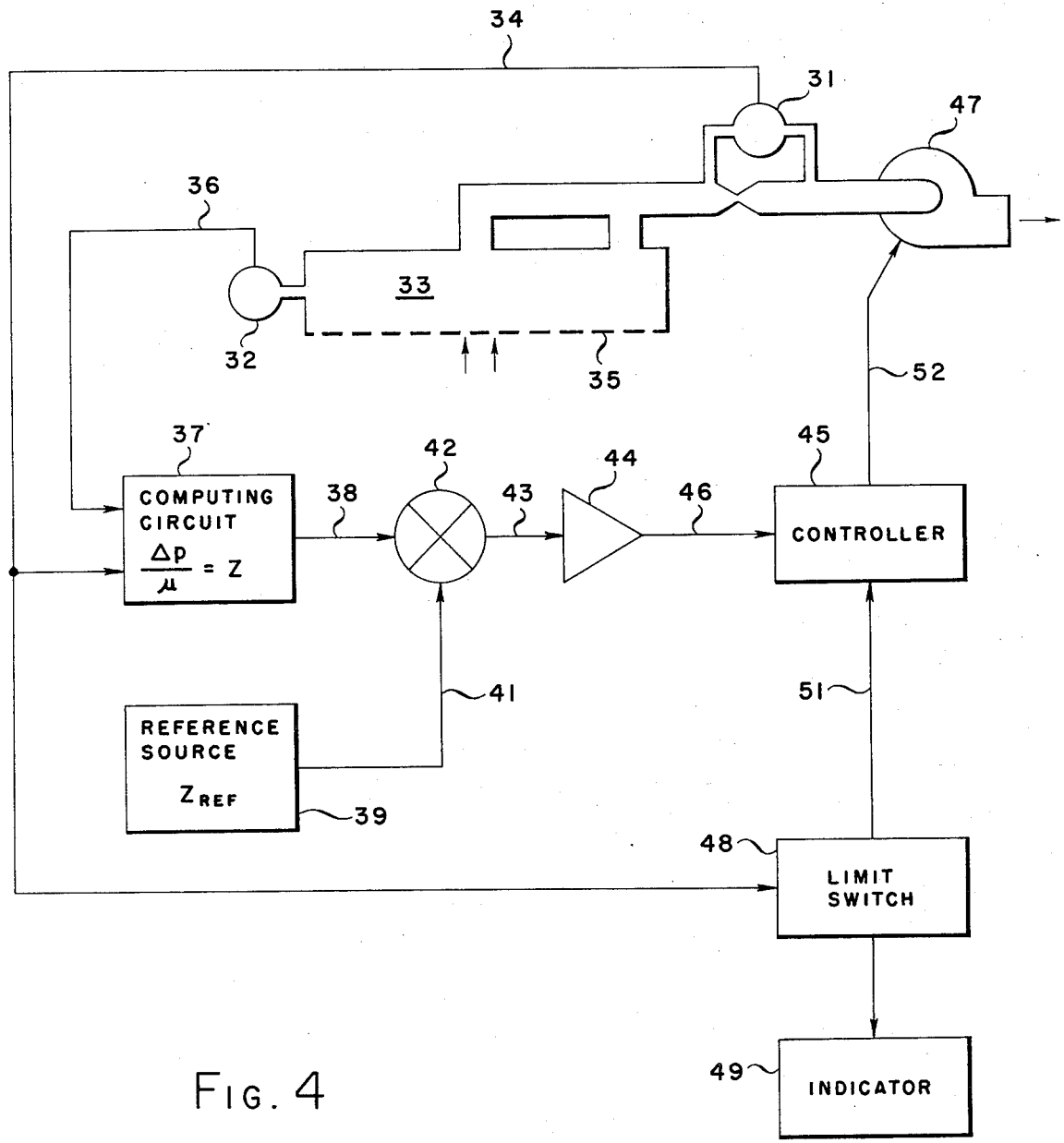

There is shown in FIG. 4 a system for maintaining the required flow conditions for proper functioning of the sound absorber, notwithstanding changes in the total open area of the perforate sheet such as may result from partial clogging of the perforations. The automatic regulator system comprises a volume flow rate sensor 31, which may be of the differential pressure pickup type, and a pressure transducer 32 responsive to the negative pressure (viz., the below-ambient pressure) in compartment 33. Sensor 31 provides a signal on line 34 indicative of the volume flow rate passing through the permeable sheet 35. This measured variable corresponds to the "u" term in the equation:

$$\Delta p / u \approx Z$$

Transducer 32 provides a signal on line 36 indicative of the differential pressure across the permeable sheet 35 and which corresponds to the "$\Delta p$" term in the above equation. The signals on lines 34 and 36 are supplied to computing circuit 37 which effectively divides the $\Delta p$ signal (on line 36) by the $u$ signal (on line 34) to yield an output control signal on line 38 that corresponds to the Z term of the above equation. A reference signal source 39 provides a reference input corresponding to the desired acoustical impedance Z, which signal is supplied via line 41 to summing junction 42. The signal on line 41 that represents the desired acoustic impedance is compared at summing junction 42 with the actually measured acoustic impedance as represented by the signal on line 38 and any difference appears as an error signal on output line 43. The error signal is supplied via line 43 to the input of servo amplifier 44 which in turn provides a control signal to motor controller 45 via line 46. The blower or pump 47 is under the direct control of controller 45. Thus, the presence of an error signal will cause the pump 47 to alter its output as required to null the error signal. For example, the accumulation of contaminants in the openings in permeable sheet 35 will progressively reduce the flow rate through the sheet and increase the differential pressure thereacross. Such clogging will, of course, ultimately shift the biasing airflow to a point outside the range of operability with respect to the sound absorption function of the system. To preclude this, it is possible to progressively decrease the output of the pump 47 to offset the diminution of the effective open area of the permeable sheet 35. The control signal on line 52 regulates (i.e., decreases the power input to) the pump 47 to make up for the loss in area of the input flow passages 35. Of course, there is a point beyond which the system cannot economically function, and a preset limit switch 48 and its associated indicator 49 may be activated automatically to shut down the system until such time as the permeable sheet 35 may be cleaned, replaced, backwashed, or otherwise serviced. The limit switch 48 is made responsive to the amplitude of the control signal appearing on line 46 and performs its shut-off control via line 51 to controller 45. Indicator 49 warns the operator when servicing of the permeable sheet 35 is necessary.

As can be seen, the closed-loop regulator system of FIG. 4 may be adjusted to maintain, automatically, a preset constant acoustical impedance of the sound absorber element 35, notwithstanding random changes in certain of the system's parameters.

The foregoing description of the preferred embodiments of the invention is not exhaustive of the scope of modifications which may be made to the invention. For example, the designer is afforded a considerable range of hole size and shape with respect to the permeable member. Also, the system need not be operated in an air environment since it is only necessary that the properties of the fluid or gas of interest be considered in establishing the system operating parameters. It should also be understood that the direction of flow through the permeable manner is immaterial with respect to the sound absorbing function. Thus, the invention may be incorporated into a system designed to blow air into the region in which sound absorption is to take place, as would be the case in a room air-conditioning system, rather than to perform the exhaust function of the ventilating system example shown in FIGS. 1 and 2. Furthermore, the designer is afforded the option of using a variety of materials for the permeable member, such as metal, plastic, ceramic, etc. The surface of the sheet may be painted or otherwise finished without impairing its sound absorption function so long as the apertures therein remain open. The permeable member may be perforated, woven, or of mesh construction, provided only that it have the capability of accommodating the flow conditions described hereinabove.

Other changes, additions, and modifications may be made to the embodiments shown, by those versed in the art, without departing from the intended scope of the invention.

What is claimed is:
1. A sound absorbing apparatus, comprising:
a perforate element having a flow resistance which is principally a non-linear function of the differential fluid pressure thereacross and which, in the absence of a differential fluid pressure thereacross, has a flow resistance which lies outside the range of approximately 10 to 200 cgs rayls; and,
means for inducing a continuous fluid flow through said perforate element at a rate sufficient to establish a flow resistance therethrough within the range from approximately 10 to 200 cgs rayls, thereby biasing said perforate element to provide acoustic absorption properties.

2. A sound absorption structure as defined in claim 1 including:
gage means or indicating the differential pressure across said perforate element.

3. A sound absorption structure as defined in claim 1 including:
gage means for indicating the rate of flow through said perforate element.

4. Sound absorption apparatus as defined in claim 1 including:
an impervious member spaced apart from said perforate element and enclosing one face thereof so as to define a compartmented space therebetween; and
means coupling said flow inducing means to said compartmented space.

5. Sound absorption apparatus as defined in claim 4 wherein said flow inducing means comprises:
blower means connected to said compartmented space for supplying pressurized gas thereto.

6. Sound absorption apparatus as defined in claim 4 wherein said flow inducing means comprises:
suction pump means connected to said compartmented space for producing a below ambient pressure therein.

7. Sound absorption apparatus as defined in claim 1 wherein perforate element comprises:
a sheet member having a plurality of apertures therethrough, the diameter and spacing of which are a fraction of the wavelength of the highest frequency of the sound to be absorbed.

8. Sound absorption apparatus as defined in claim 1 wherein said perforate element comprises:
an open-weave screen, the interstices of which are smaller than the wavelength of the highest frequency of the sound which is to be absorbed.

9. A self-regulating sound absorption system, comprising:
a permeable panel;
an impermeable panel spaced apart from said permeable panel and enclosing one face thereof to provide a compartmented space therebetween;
pump means, having an adjustable capacity, coupled to said compartmented space to provide a fluid pressure differential across said permeable panel by reason of fluid flow induced therethrough;
pressure sensor means connected to said compartmented space to provide a first control signal corresponding to the differential fluid pressure across said permeable panel;
fluid flow rate sensor means responsive to said pump means to provide a second control signal corresponding to the fluid flow rate produced by said pump means;
computing circuit means, connected to said pressure sensor means and to said flow rate sensor means, for dividing said first control signal by said second control signal to produce a third control signal;
reference source means for providing a preselected fixed reference signal corresponding to the acoustical impedance of the fluid extant in said system;

means for comparing said third control signal with said reference signal to provide a difference error signal; and, controller means operatively connected to said pump means and responsive to said difference error signal to adjust the capacity of said pump so as to null said error signal, and thereby bias the flow resistance of said permeable panel into an acoustically useful range.

10. Sound absorbing apparatus, comprising:

a perforate element having a flow resistance which is principally a non-linear function of the differential fluid pressure thereacross; and means providing a differential fluid pressure across said perforate element sufficient to bias the flow resistance therethrough to a value substantially equal to the acoustical impedance of said fluid.

11. Sound absorbing apparatus, comprising:

a perforate element having a flow resistance which is principally a non-linear function of the differential fluid pressure thereacross; and, means for including a continuous flow of gas through said perforate element so as to establish a relationship between the flow produced by said flow inducing means and the permeability of said perforate element such that $\Delta p/u$ will be of the same order of magnitude as the characteristic acoustical impedance of said gas, where $\Delta p$ is the differential gas pressure across the perforate element and $u$ is the approach velocity of said gas to said perforate element.

12. Sound absorbing apparatus, comprising:

a perforate element having a flow resistance which is principally a non-linear function of the differential fluid pressure thereacross; and, means providing a differential air pressure across said perforate element sufficient to bias the flow resistance therethrough to be substantially equal to an acoustical impedance of 42 centimeter-gram-second rayls.

* * * * *